United States Patent [19]

Robins

[11] 3,997,945
[45] Dec. 21, 1976

[54] APPARATUS FOR EXERTING A COMPRESSIVE FORCE INCLUDING FRICTION GRIPPING DEVICE THEREFORE

[75] Inventor: Milton Robins, Marina Del Rey, Calif.

[73] Assignee: PTI - Dolco, Los Angeles, Calif.

[22] Filed: Dec. 8, 1975

[21] Appl. No.: 638,886

[52] U.S. Cl. .................. 24/129 R; 24/DIG. 21; 135/15 CF; 256/31
[51] Int. Cl.² .................. F16G 11/00; A45F 1/16; E21B 19/00
[58] Field of Search .... 24/73 CF, DIG. 21, 73 MC, 24/73 LA, 73 R, 115 A, 3 B, 129 C, 129 W, 129 A, 129 B, 129 R; 135/15 CF; 256/DIG. 1, DIG. 2, 31

[56] References Cited
UNITED STATES PATENTS

| | | | |
|---|---|---|---|
| 437,470 | 9/1890 | Wright | 24/129 R UX |
| 601,805 | 4/1898 | Cook | 135/15 CF |
| 702,827 | 6/1902 | Sircolomb | 24/129 B UX |
| 890,898 | 6/1908 | Gaillac | 24/129 B UX |
| 1,021,613 | 3/1912 | Lingwall | 256/31 X |
| 1,666,493 | 4/1928 | Gurney | 24/DIG. 21 UX |
| 1,730,656 | 10/1929 | Hilland | 24/DIG. 21 UX |
| 2,284,069 | 5/1942 | Robertson | 24/3 B UX |
| 2,516,894 | 8/1950 | Lushbaugh | 135/15 CF |
| 3,409,014 | 11/1968 | Shannon | 24/129 B X |
| 3,743,330 | 7/1973 | Itatani | 24/DIG. 21 X |

Primary Examiner—Donald A. Griffin
Attorney, Agent, or Firm—J. B. McGuire

[57] ABSTRACT

The illustrated embodiment discloses a compressive force application device, which might be used on a gate to prevent sagging thereof, including a plate having eyelets therein through which the tensioning cord or cable may be threaded so that it adjoins itself; thus, the threaded relationship is maintained by the cable's frictional contact with itself.

10 Claims, 5 Drawing Figures

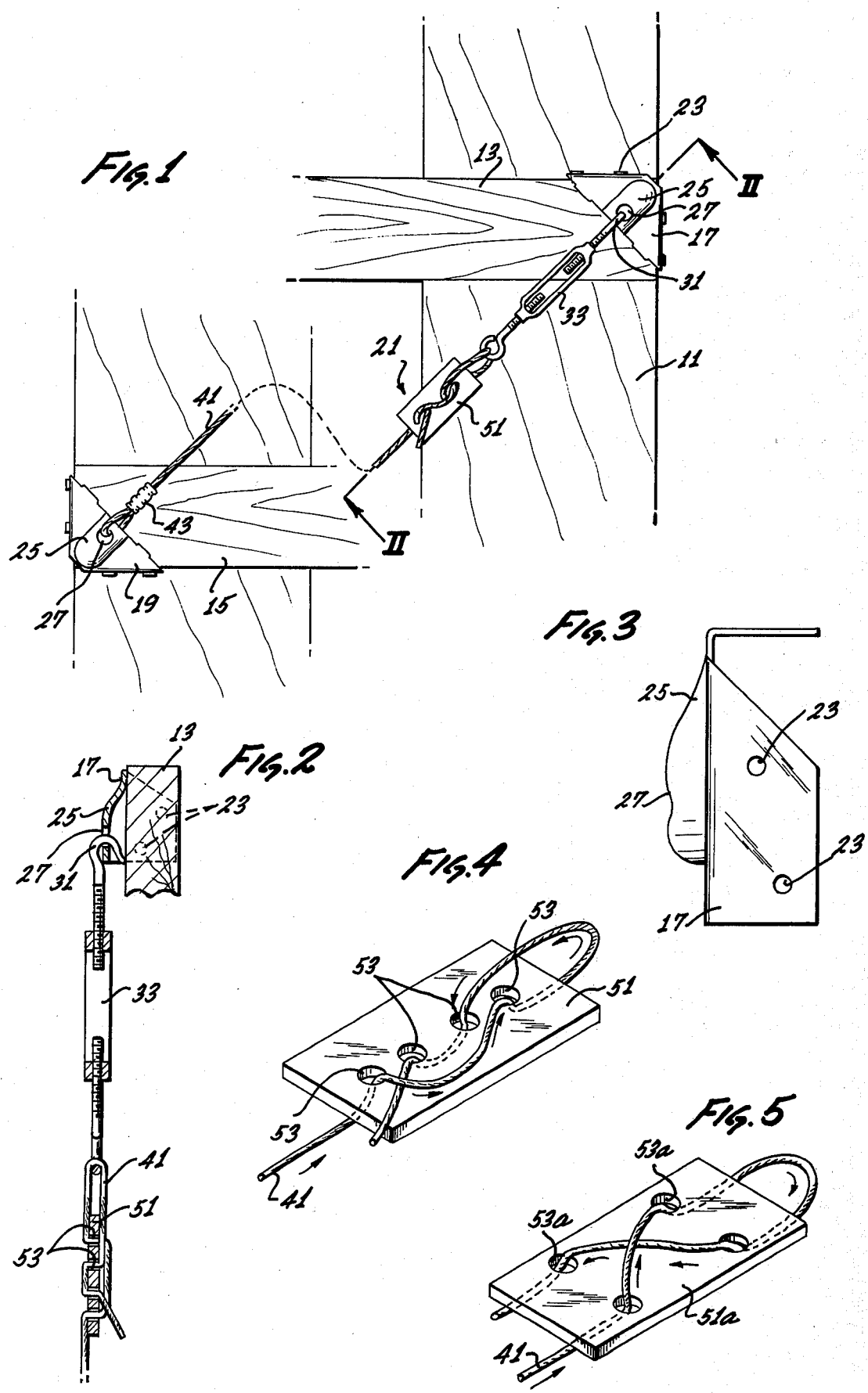

APPARATUS FOR EXERTING A COMPRESSIVE FORCE INCLUDING FRICTION GRIPPING DEVICE THEREFORE

BACKGROUND OF THE INVENTION

There are many instances in which it is required to apply a compression force across a large area. For example, it is often desired to produce such a force on a gate by drawing the bottom portion of the swinging or free side of the gate toward the top portion of the hinged side of the gate. When applied in this manner, the compressive force prevents the gate from sagging so that it will continue to close properly, etc.

Many devices have been proposed in the past to produce such a compressive force. In general, most of them comprise a cable, wire, or line of some sort which is fixed near one corner of the gate. There is also usually provided a device fixed to the gate at the diagonally opposite corner by means of which the cable can be tensioned, thereby causing a compression force to be exerted on the gate itself.

In most cases, the amount of force which can be exerted has been dependent upon the manner in which the cable is attached to the devices mounted on the gate. For example, if the end of the cable is merely threaded through one of the devices and then coiled around itself, any strong tensile force will normally overcome the strength of the coil and cause the cable to be loosened, thereby defeating the entire purpose of the device. On the other hand, some devices have employed clamps or crimped sleeves to hold the cable in place. While the use of crimped sleeves is quite satisfactory from the standpoint of strength and economy, it will quickly be realized that it is only possible to use such a structure at one end of the cable since the manufacturer cannot determine what length of cable will need to be employed by the consumer.

When a cable clamp is used so that the resultant strength is sufficient to produce the desired result, the product becomes heavier and more expensive due to the clamp's relatively high bulk and cost.

In addition, after a period of time, the cable may stretch and cause the gate to sag again, thereby necessitating disconnection of the clamping means which, at times, may be impossible.

In other words, the art has not previously presented a low cost, efficient, lightweight structure which will produce a compressive force on a large area, such as a gate, and have sufficient strength to accomplish the task under all conditions.

SUMMARY OF THE INVENTION

The present invention relates to such a device in which a cable or wire may be clamped to itself by a crimped tube or similar device on one end and locked in an adjustable position at the opposite end by means of friction which the cable will exert against itself.

In the preferred embodiment, the locking device comprises a very simple, lightweight, and inexpensive plate having a plurality of eyelets formed therein through which the cable can be threaded. Suitable location of the eyelets and proper threading of the cable will cause the cable to overlap or adjoin itself so that the tension exerted on the cable, to cause the compressive force in the object or gate being maintained, will create sufficient friction between the adjoined sections of the cable to hold it in place. Additionally, if the eyelets are formed so as to be just slightly larger than the diameter of the cable, the cable will grip the edges of the eyelets in a manner which also prevents the cable from slipping out of the plate. If the apertures or eyelets are positioned along a generally straight line and the cable is threaded, first, through the first and last eyelets, the natural tendency of a wire to extend in a straight line will cause it to push the portions of the wire in intermediate eyelets in directions substantially perpendicular to the general line of extension of the wire. This pushes the wire portions in the intermediate eyelets tightly against their respective aperture edges, thus causing the wire to frictionally engage itself, as well as to have the aperture edges "bite" into the wire.

Thus, a very inexpensive, lightweight, pre-drilled plate may be employed to adjust the length of the cable to as short a dimension as possible prior to the time that tension is applied to the cable by a suitable means such as a turnbuckle. In other words, rather than employing a stronger, heavier, and more expensive apparatus, such as a bigger clamp, as might be obvious when structural strength is to be increased, the present invention moves in exactly the opposite direction and employs a small device which causes the cable itself to do all of the clamping work.

Also, in employing the preferred embodiment of this invention, it may be desirable to provide elements which provide a suitable structure for holding the cable, turnbuckle, etc., away from the gate itself in order to prevent interference therewith. Accordingly, in some applications, corner clamps, which can be suitably fastened to gate cross supports such as two by fours, may be provided with raised sections thereon for receipt of the cable and/or a hook from a turnbuckle.

This expedient allows an individual homeowner to install the compression device very quickly and easily. It also prevents an inadvertent jam-up of the parts against the gate which might release at a later time, possibly undoing the installation entirely and at least reducing the tension exerted through the cable.

The invention, together with its objects, advantages, alternative modes, embodiments, etc., will be readily understood by those skilled in the art upon reviewing the following detailed description, taken together with the accompanying drawing which illustrates what is presently considered to be the preferred embodiment of the best mode contemplated for utilizing the invention which is defined in the claims.

BRIEF DESCRIPTION OF THE DRAWINGS

FIG. 1 comprises an elevation of a gate structure employing an apparatus in accordance with the present invention to produce a compressive force in the gate and thereby prevent it from sagging;

FIG. 2 comprises a side elevation of a portion of the structure shown in FIG. 1, as seen along the line II—II thereof, but with the tensioning device 21 reversed 180°, as though being seen from the opposite side;

FIG. 3 comprises a side view of an end clamp which may be utilized to fasten a device formed in accordance with the present invention to a gate or other structure; and FIGS. 4 and 5 comprise isometric illustrations of two different locking devices which may be employed to utilize the present invention.

DETAILED DESCRIPTION

As shown in FIG. 1, a device formed in accordance with the present invention can be utilized to provide a compressive force on any planar structure, such as a gate 11 having two strengthening cross members 13 and 15. As shown, the device employed may, in the preferred embodiment illustrated, comprise a pair of clamps 17 and 19 which are interconnected by a tensioning device 21 to draw the clamps toward one another. If desired, each clamp may be suitably fastened to the edges of its related cross member by any suitable means such as nails, screws, etc., which may pass through apertures 23 therein. Each of the clamps may be provided with a raised central portion or element 25 having an aperture 27 therein.

As shown in FIGS. 1 and 2, the hook 31 of a turnbuckle 33 may be installed through the aperture 27 of bracket 17. The raised central portion 25 of the bracket allows the hook to be quickly and easily passed through the aperture 27 in such a manner that it will not bind against the support member 13. Such binding could cause, in some cases, the tensioning device to be released or lose some of its tension if the hook became jarred by vibration of the gate closing over a period of time.

It will be noted that in the depiction of FIG. 1, the righthand side of the gate is the hinged side thereof and the lefthand side is the free side thereof. Thus, the tension device 21 is employed to pull or compress the lower, free side of the gate toward the upper, hinged side thereof. Realizing that this device can be employed on any large planar surface, it may commonly be employed on a gate so as to prevent the free side of the gate from sagging and/or binding against its latch post to hinder opening or closing of the gate.

Through the aperture 27 in the bracket 19, a cable, wire, cord, or similar element 41 may be passed and brought through a 180° bend so as to adjoin itself within a sleeve 43. The sleeve may then be crimped in any suitable manner to prevent relative movement between the adjoined portions of the cable 41.

In order to facilitate the ability of the average homeowner or gate construction worker to install a device formed in accordance with the present invention, there may be provided a rather simple lightweight, plate-like element 51, having eyelets 53, through which the free end of cable 41 may be threaded. This device allows the cable to be gripped by the free end of the turnbuckle 33, while preventing release of tension in the cable.

A comparison of FIGS. 1 and 4 will reveal that the element 41 may be threaded through the apertures or eyelets 53 in the plate 51 in such a manner that the cable may be gripped by the edges of the eyelets 53 to prevent relative movement. This feature may be facilitated if the eyelets are provided to be only slightly larger in diameter than the cable.

With particular reference to FIG. 4, it can be seen that cable 41 may be threaded in a first direction through a first aperture 53 and in an opposite, second direction in a fourth or last aperture 53. An end loop may then be formed in the cable which may be passed through the eye bolt of turn buckle 33 as shown in FIG. 1. Then, the cable may be brought back and threaded through an intermediate aperture 53 in the first direction and another intermediate aperture 53 in the second or opposite direction. Due to the natural tendency of a wire to extend in a straight line when it is under tension, if the apertures 53 are located in a generally straight line, that portion of the wire between the first and last apertures 53 will tend to push the portions of the wire threaded through one or more intermediate apertures out of the way.

Thus, the portion of the wire or cable extending between the end apertures will tightly engage that portion of the wire threaded through any intermediate apertures in frictional contact and will push the latter portions of the wire against the edges of the second and third apertures 53 to cause the aperture edges to "bite" into the wire and aid in holding it in place. This relationship is shown in FIG. 1; it will be realized by those skilled in the art that the biasing force exerted by the portion of the wire extending between the end apertures is substantially perpendicular to a straight line passing through the apertures. In other words, the biasing force is substantially perpendicular to the general direction of extension of the wire 41.

In any event, it is preferred that the eyelets 53 be provided in a suitable relationship so that threading of the cable through the eyelets will cause the various portions of the cable to be adjoined or overlapped. The friction which results from such adjoining will further prevent the cable from slipping out of the plate.

In use, a person installing the tensioning device 21 can mount the clamps 17 and 19 in the manner illustrated and then install the hook 31 of turnbuckle 33 in the clamp 17. Preferably the cable will have been threaded through the aperture 27 in clamp 19 and crimped within the sleeve 43 during the manufacture thereof. If this has been accomplished, the installer may then thread the cable 41 through the eyelets of plate 51 in the manner illustrated in FIG. 4, leaving a sufficient loop for attachment to the free end of the turnbuckle. Of course, the installer must leave as little slack as possible in the cable 41 when he has completed this step in order to achieve his desired result. Then, when he turns the body of the turnbuckle 33, he will be able to draw sufficient tension in the cable 41 to takeup and/or prevent sagging of the gate 11. When this has been accomplished, the installer can then cut the free end of the cable 41 close to the plate 51.

A careful study of FIG. 4 shows that the particular location of the eyelets in the plate is not critical, so long as there is sufficient or overlapping of the sections of the cable to create friction sufficient to prevent slipping of the cable. Of course, as set forth previously, if the apertures 53 are aligned along a generally straight line, the tendency of the wire 41 to straighten itself under tension will increase the force tending to fix the wire against movement relative to the plate 51.

An alternate plate embodiment can be seen from FIG. 5, wherein like elements have been provided with substantially the same identification numerals, followed by the letter "a". The eyelets 53a define a polygonal configuration in this embodiment which causes the cable to be adjoined in overlapping relationship. Those skilled in the art will thus realize that a wide variety of eyelet locations may be employed. In any event, the eyelets are preferably located to create sufficient friction between the adjoined portions of the cable so that the cable cannot slip.

Those skilled in the art will now realize that the present invention may be employed in a very simple, low cost device and that a wide variety of embodiments may be used within the scope of the invention of the following claims, many of which may not even physically resemble those embodiments illustrated and described here.

I claim:

1. Apparatus for applying a compression force comprising
a plurality of gripping means,
tensioning means for flexibly joining said gripping means including
first, second, third, and fourth portions thereof, and means for prohibiting inadvertent release of said tensioning means comprising
plate means including
a plurality of apertures therein located along a substantially straight line,
said first tensioning means portion being fixedly attached to one of said gripping means,
said second tensioning means portion is extended consecutively through the first and last apertures of said plurality of apertures in said plate means,
said third tensioning means portion comprising a loop for attachment to one of said plurality of gripping means, and
said fourth tensioning means portion is extended consecutively through two apertures, intermediate the first and last apertures, of said plurality of apertures in said plate means.

2. The apparatus of claim 1 including
means for adjusting the length of said tensioning means.

3. The apparatus of claim 1 wherein
said plate means includes
a first side and
a second side, said plurality of apertures extending between said first and second sides, and
said second tensioning means portion extends between the first of said plurality of apertures from said first side of said plate means and the last of said plurality of apertures from said second side of said plate means.

4. The apparatus of claim 3 wherein
said fourth tensioning means portion enters the first of the intermediate apertures through which it extends from the second side of said plate means.

5. Apparatus for applying a compression force comprising
first and second fastening means,
flexible means extending between, and fixed to, at least one of said first and second fastening means, said flexible means comprises
an elongated portion and
a fastening portion, and plate means having
a first side,
a second side, and
at least four apertures extending between said first and second sides, said fastening portion being threaded through said apertures so that, under tension, sections of said fastening portion will be urged into contact with the edges of certain of said apertures by other sections of said fastening portion exerting forces directly thereagainst in directions approximately perpendicular to a line extending between said first and second fastening means.

6. The apparatus of claim 5 including
adjustable means extending between said fastening portion and the other of said first and second fastening means for exerting a tension force on said flexible means.

7. Apparatus for fixing a length of flexible material in place comprising
a plate means having
a first side,
a second side, and
at least four eyelets extending from said first side to said second side, said eyelets being arranged in a substantially straight line,
a flexible means threaded through said eyelets in such an order of threading that a portion of said flexible means is urged against the periphery of at least one of said eyelets in a direction approximately perpendicular to the substantially straight line of arrangement of said eyelets, and
means for exerting a tensioning force on said flexible means for urging the portion thereof in the approximately perpendicular direction.

8. The apparatus of claim 7 wherein
said flexible means is threaded through said first, fourth, third, and second eyelets in said plate means sequentially, entering said first and third eyelets from opposite sides of said plate means.

9. The apparatus of claim 1 wherein
said tensioning means includes
cable means of slightly smaller diameter than at least said intermediate apertures.

10. The apparatus of claim 9 wherein
said tensioning means further includes
means for exerting a tensile force in said cable means.

* * * * *